United States Patent
Willems

(10) Patent No.: US 6,386,355 B1
(45) Date of Patent: May 14, 2002

(54) CONVEYOR DEVICE

(75) Inventor: Eric Arnoldus Wilhelmus Adriana Willems, Aalst (NL)

(73) Assignee: Flex Industries B.V. (NL)

( * ) Notice: Subject to any disclaimer, the term of this patent is extended or adjusted under 35 U.S.C. 154(b) by 0 days.

(21) Appl. No.: 09/600,050

(22) PCT Filed: Jan. 12, 1999

(86) PCT No.: PCT/NL99/00016

§ 371 Date: Oct. 10, 2000

§ 102(e) Date: Oct. 10, 2000

(87) PCT Pub. No.: WO99/35063

PCT Pub. Date: Jul. 15, 1999

(30) Foreign Application Priority Data

Jan. 12, 1998 (NL) ............................................. 1008010

(51) Int. Cl.[7] ............................................... B65G 17/06
(52) U.S. Cl. ...................... 198/852; 198/831; 198/842
(58) Field of Search ................................ 198/852, 831, 198/842

(56) References Cited

U.S. PATENT DOCUMENTS

| 3,094,206 A | | 6/1963 | Stewart et al. ............... 198/189 |
|---|---|---|---|
| 3,776,349 A | * | 12/1973 | Kampfer ..................... 198/195 |
| 3,788,447 A | * | 1/1974 | Stephanoff .................... 198/41 |
| 3,880,276 A | | 4/1975 | Willett, III ................... 198/193 |
| 5,307,923 A | * | 5/1994 | Damkjaer .................... 198/852 |
| 5,404,997 A | * | 4/1995 | Schreier et al. .............. 198/779 |
| 5,697,492 A | * | 12/1997 | Damkjaer .................... 198/852 |
| 5,803,236 A | * | 9/1998 | Wahren ....................... 198/582 |
| 6,298,982 B1 | * | 5/2000 | Layne et al. ................. 198/831 |
| 6,085,895 A | * | 7/2000 | Osaka et al. ................. 198/831 |
| 6,129,202 A | * | 10/2000 | Layne et al. ................. 198/831 |
| 6,250,459 B1 | * | 6/2001 | Coen et al. .................. 198/852 |

FOREIGN PATENT DOCUMENTS

| DE | 1016633 | 9/1957 |
|---|---|---|
| FR | 2252268 | 6/1975 |
| GB | 333707 | 8/1930 |
| GB | 730124 | 5/1955 |

* cited by examiner

Primary Examiner—Christopher P. Ellis
Assistant Examiner—Rashmi Sharma
(74) Attorney, Agent, or Firm—Webb Ziesenheim Logsdon Orkin & Hanson, P.C.

(57) ABSTRACT

A conveyor device is disclosed having a support surface, a link chain pivoting parallel to the support surface, and support elements arranged on the links. The links rest on a guide through associated rollers at least in a bend of the guide. The rollers are arranged in the guide such that the flanks of the links run along the rollers. The flanks define an inward curved surface when viewed in a direction perpendicular to the support surface. The radius of the curved surface corresponds with the radius of the bend in the guide.

12 Claims, 3 Drawing Sheets

CONVEYOR DEVICE

BACKGROUND OF THE INVENTION

1. Field of the Invention

The invention relates to a conveyor devices.

2. Description of the Prior Art

A conveyor device is known from patent publication No. DE-B-1016633. The form and the radius of the curved surface of the conveyor device of this reference is not specified and is therefore random.

SUMMARY OF THE INVENTION

The object of the invention is to provide a conveyor device wherein the links undergo minimum friction, particularly in the guiding through a bend.

Another object according to the invention is to provide a conveyor device which, over its whole guiding and particularly in bends, allows of a parallel positioning of the support elements on the support surface. The link chains for this purpose are assembled from a number of links which are mutually coupled via pins. These pins generally extend transversely of the support surface, as shown inter alia in the patent publication U.S. Pat. No. 3,094,206. These link chains are not suitable however for spanning a height difference. A height difference has for instance to be spanned when a link chain is returned on the underside of the support surface to complete the circuit of the link chain.

These known link chains are moreover subject in the bend to an unbalanced moment of forces. The support elements hereby extend in bent or oblique manner relative to the support surface. This is a drawback since in general only horizontally extending support elements ensure an appropriate transport wherein the goods for transporting remain on the support elements. A further object of the invention is moreover to provide a conveyor device with a further decrease in the friction of the link chain in the bend.

This has the effect that a balanced couple of forces occurs in the bend, thus ensuring a horizontal surface for the support elements.

The friction occurring due to the tensile forces during movement of the link chain is moreover minimized, thus resulting in a longer lifespan of the links.

According to a first preferred embodiment of the invention, the rollers are arranged in the guidance. The flanks herein run over the rollers in a bend. In this embodiment the flanks can further be provided with a curved surface, the radius of which corresponds with the radius of the bend and wherein the flanks lie against each other in a bend such that they form one continuous curved surface. The links hereby run from the one roller onto another roller without jolting, whereby wear of the links is further reduced.

The invention will be further elucidated hereinbelow with reference to the annexed drawings.

DETAILED DESCRIPTION OF THE PREFERRED EMBODIMENT

Figure 1:
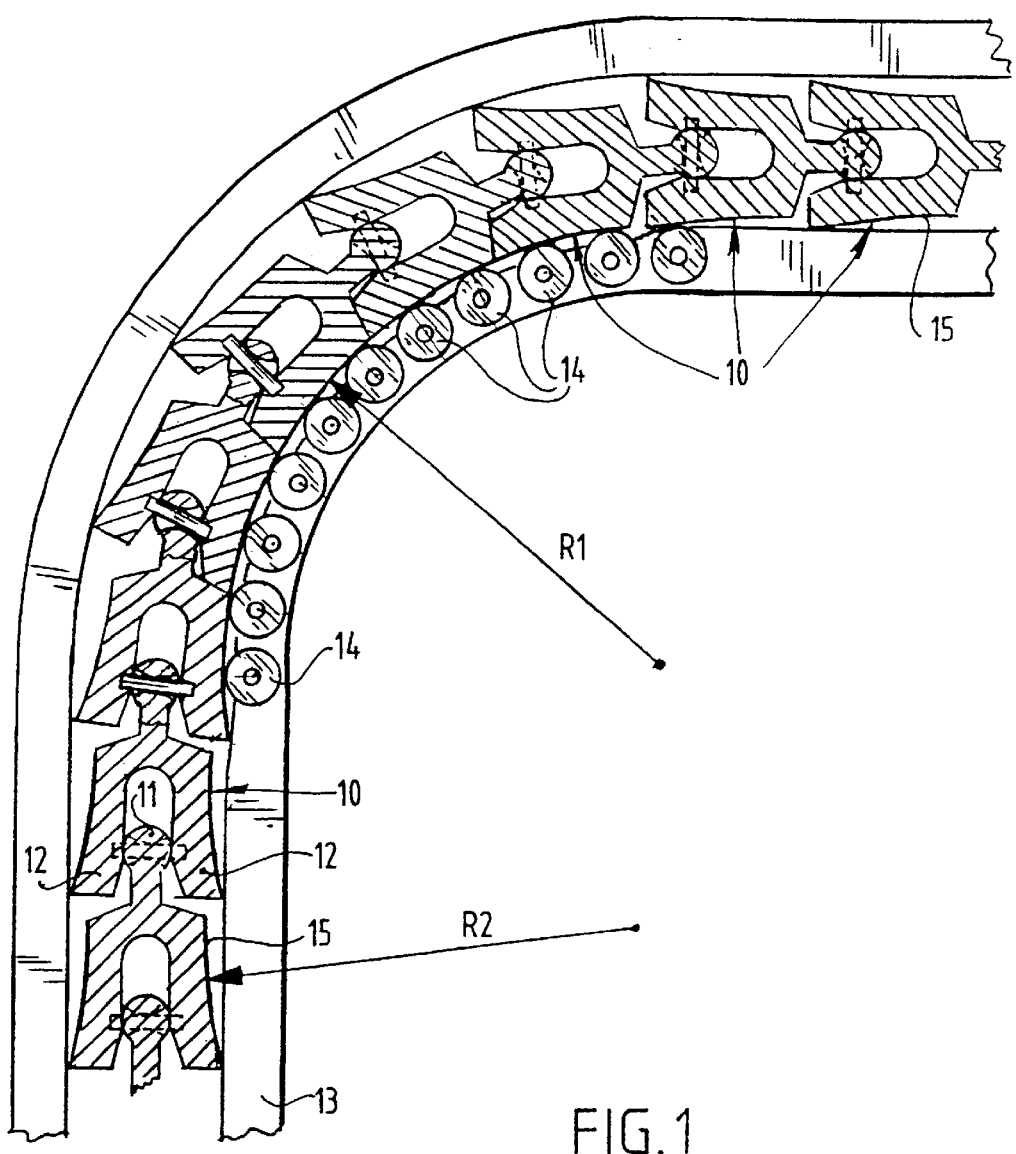
FIG. 1 shows a top view in cross-section of a second embodiment according to the invention.

FIG. 1 shows a first preferred embodiment according to the invention. Shown herein are links 10 comprising a spherical head portion 11 with a diabolo-shaped cavity and two legs 12 connected thereto. The link chain is guided through a guidance 13 which is provided with rollers 14 in the bend with radius R1. Links 10 herein run over rollers 14, whereby only a rolling resistance has to be overcome and wear of both the guidance 13 and links 10 is reduced.

In order to improve the running of links 10 along rollers 14, the flanks of links 10 comprise a curved surface 15 having a radius R2 corresponding with radius R1 of the bend. Links 10 herein lie against each other in the bend such that they form one continuous curved surface with radius R1, whereby links 10 can be guided through the bend without jolting.

Figure 2:
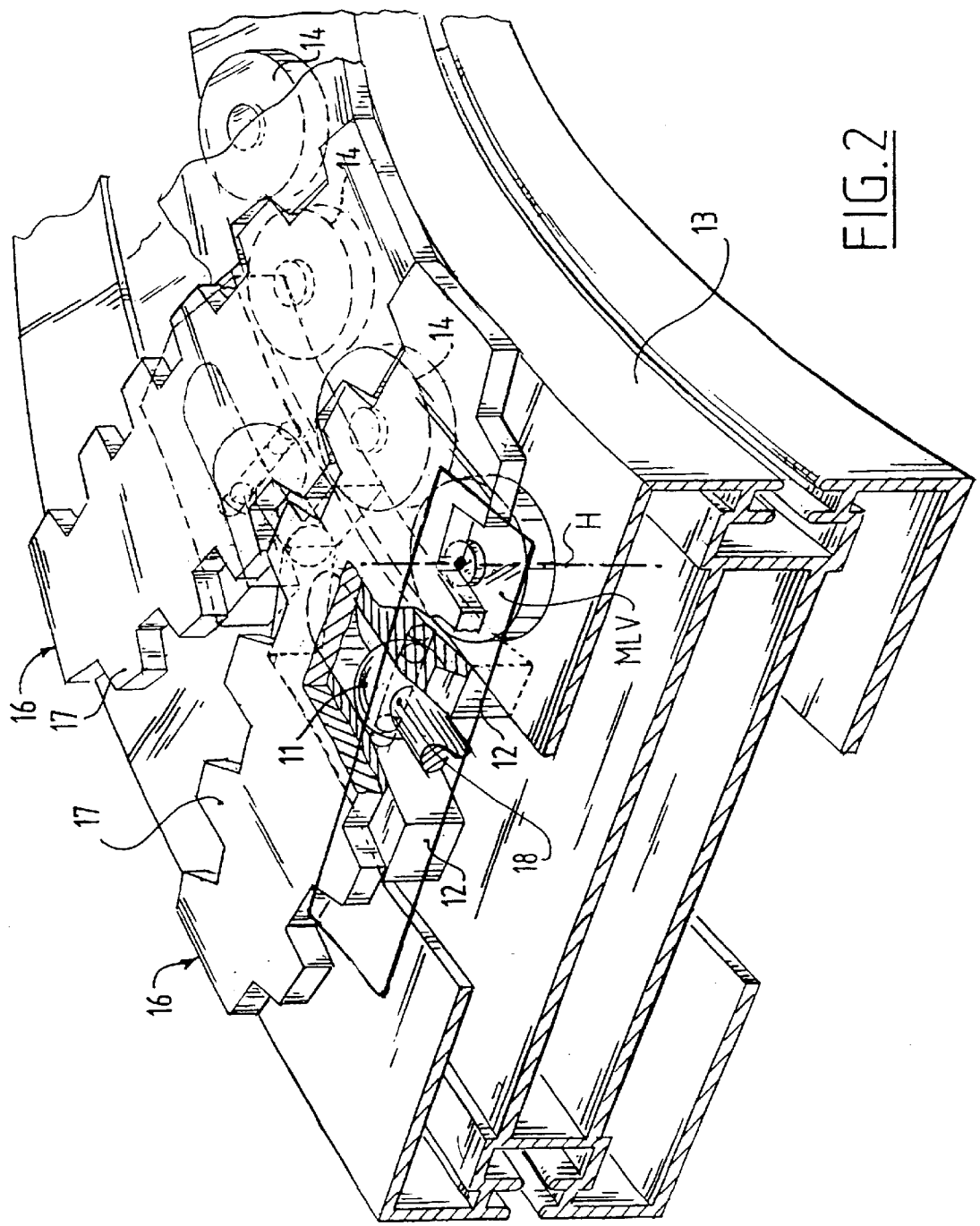
FIG. 2 shows a perspective view of the second embodiment with partially cut-away parts.

FIG. 2 shows a perspective view of the embodiment of FIG. 1. Support elements 16 are further arranged on links 10. These support elements have on both sides a gear wheel-like toothing 17 whereby during pivoting parallel to the support surface the elements 16 mesh as two toothed wheels. The central plane perpendicular MLV to the axis H of a roller 14 is shown clearly in FIG. 2. The central plane perpendicular MLV to the axis H of roller 14 passes through the link pin 18 of link 10. The support elements hereby always extend parallel to the support surface and the moments of force on the support elements are always evenly balanced.

Guidance 13 consists for instance of a drawn aluminum profile which is symmetrical relative to a central plane parallel to the support surface, whereby the link chain can be returned on the underside when desired.

The flanks of the links are preferably formed by a full surface. The links are mutually coupled with freedom of movement, for instance as a ball hinge.

The flanks of the links moreover have a length such that they lie against each other in the bend and form one continuous surface.

Figure 3:
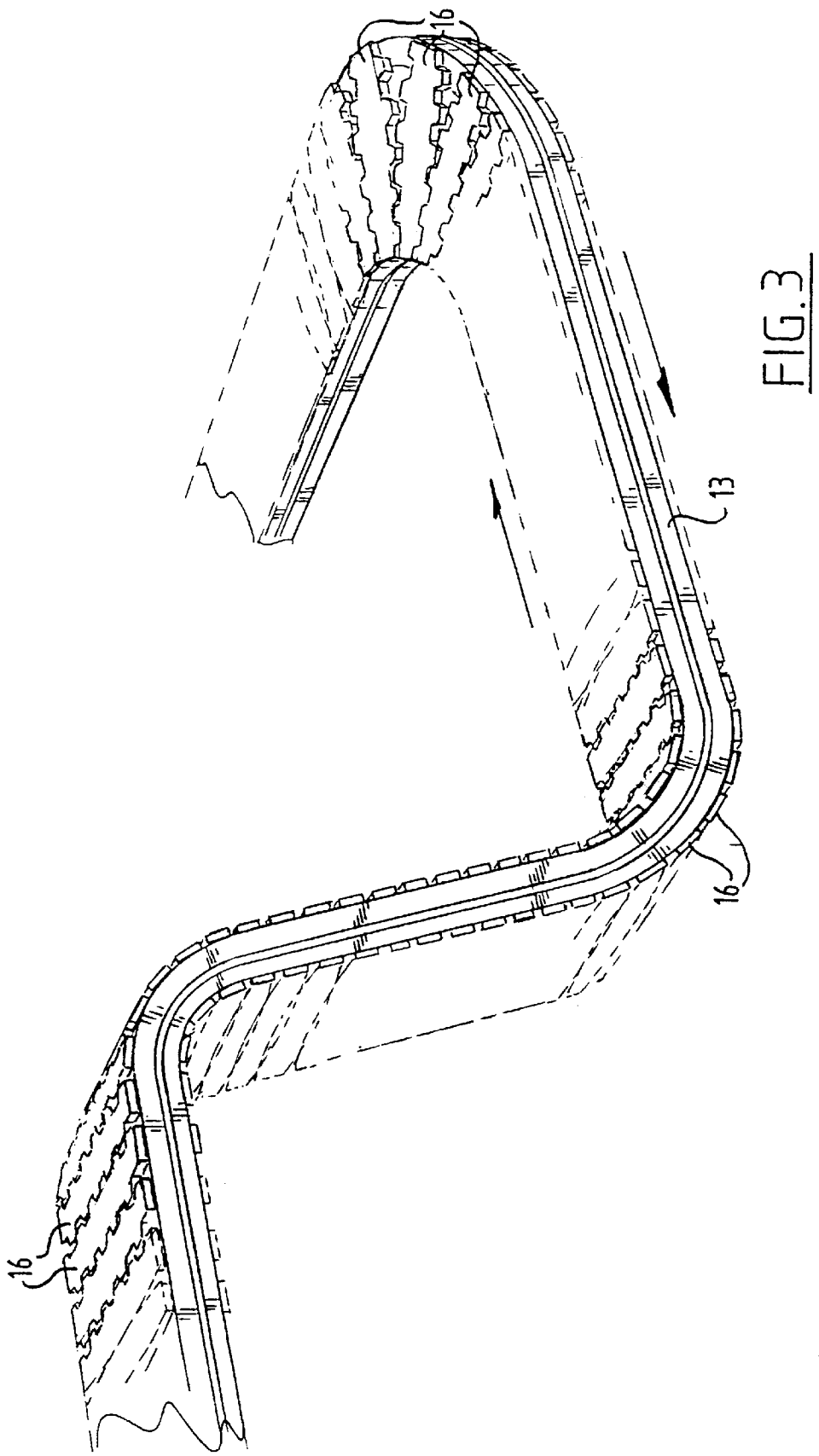
FIG. 3 shows a perspective view of a conveyor device according to the invention.

A conveyor belt according to the invention is shown in FIG. 3 wherein it is apparent that the link chain is pivotable parallel to the support surface and in a plane perpendicular to the conveying direction. Return of the link chain is also shown clearly here.

What is claimed is:

1. A conveyor device, comprising:

a support surface;

a link chain pivoting parallel to the support surface;

support elements arranged on the links; and a guidance for guiding the link chain, wherein at least in a bend of the guidance the links rest on the guidance through associated rollers, wherein the rollers are arranged in the guidance such that flanks of the links run along the rollers, wherein as seen in a direction perpendicular to the support surface the flanks define an inward curved surface, and wherein a radius of the curved surface corresponds with the radius of the bend in the guidance.

2. The conveyor device according to claim 1, wherein the links are mutually coupled via a link pin that extends parallel to the support surface, and wherein a central plane lying perpendicular to an axis of the rollers passes through the link pin.

3. The conveyor device as claimed in claim 1, wherein the flanks form a full surface.

4. The conveyor device as claimed in claim 2, wherein the links are mutually coupled with freedom of movement.

5. The conveyor device as claimed in claim 4, wherein the mutually coupled links form ball hinges.

6. The conveyor device as claimed in claim 1, wherein the flanks of the links have a length such that the flanks lie against each other in the bend and form one continuous surface.

7. The conveyor device as claimed in claim 2, wherein the flanks form a fall surface.

8. The conveyor device as claimed in claim 3, wherein the links are mutually coupled with freedom of movement.

9. The conveyor device as claimed in claim 2, wherein the flanks of the links have a length such that the flanks lie against each other in the bend and form one continuous surface.

10. The conveyor device as claimed in claim 3, wherein the flanks of the links have a length such that the flanks lie against each other in the bend and form one continuous surface.

11. The conveyor device as claimed in claim 4, wherein the flanks of the links have a length such that the flanks lie against each other in the bend and form one continuous surface.

12. The conveyor device as claimed in claim 5, wherein the flanks of the links have a length such that the flanks lie against each other in the bend and form one continuous surface.

* * * * *

UNITED STATES PATENT AND TRADEMARK OFFICE
CERTIFICATE OF CORRECTION

PATENT NO.     : 6,386,355 B1
DATED          : May 14, 2002
INVENTOR(S)    : Eric Arnoldus Wilhelmus Adriana Willems It is certified that error appears in the above-identified patent and that said Letters Patent is hereby corrected as shown below:

<u>Column 1,</u>
Line 5, after "relates to" delete "a".

<u>Column 3,</u>
Line 6, "fall surface" should read -- full surface --.

Signed and Sealed this

Twenty-third Day of July, 2002

Attest:

Attesting Officer

JAMES E. ROGAN
*Director of the United States Patent and Trademark Office*